VISCOSITY OF CELLULOSE NITRATE IN ETHYL ALCOHOL

Gale F. Nadeau
Austin J. Gould
INVENTOR

Patented Aug. 24, 1943

2,327,814

UNITED STATES PATENT OFFICE 2,327,814

MANUFACTURE OF PHOTOGRAPHIC FILM SUPPORTS

Gale F. Nadeau and Austin J. Gould, Rochester, N. Y., assignors to Eastman Kodak Company, Rochester, N. Y., a corporation of New Jersey Application December 16, 1939, Serial No. 309,634

2 Claims. (Cl. 18—57)

This invention relates to a process of producing photographic film and sheeting, and more particularly to the production of cellulose nitrate film by a process involving gelation.

As is well known, photographic film base and similar types of sheeting are generally produced by depositing a thin layer of a solution of cellulose derivative in a volatile solvent or solvent mixture on an appropriate film-forming surface, such as the highly polished surface of a slowly rotating wheel or drum, removing solvents therefrom until this layer has solidified in the form of a film, removing the film from the surface and curing out residual solvent. For the manufacture of most types of protographic film base, particularly those intended for use in the motion picture industry, it is customary to employ solutions or dopes of cellulose nitrate of various types. One of the most commonly employed dopes is one which may be referred to as noncoagulating, that is, a dope which solidifies by a gradual loss of solvent by evaporation. In such dopes, as the solvent evaporates there is a gradual increase in viscosity of the solution, but no sudden change whereby the solution passes spontaneously into a solidified condition.

Experience has indicated that in the manufacture of photographic film support and similar types of cellulose derivative sheeting, the material possessing the most desirable physical characteristics is obtained from what may be described generally as the coagulating or gelling type of dopes. In other words, the best materials and the most efficient film-forming processes are those in which the dope is of such a nature as to be capable of coagulation or setting by gelation. The fundamental characteristics of these dopes is that they do not cohere or solidify by a gradual loss of solvent by evaporation, but on the contrary, can be made, under proper conditions, to reach a stage where they suddenly become solid or semi-solid while still containing relatively large proportions of their original solvent content.

The solvents employed to disperse the cellulose ester in the coagulating type of dope should not be chosen from the best solvents for that particular ester. Thus with cellulose nitrate one can obtain a much better film support when the film is formed from dopes containing methanol than from dopes containing large quantities of acetone. As is well known, acetone is a much better solvent for nitrate than is methanol. With the mixed esters, such for example, as cellulose acetate propionate, a similar situation prevails. When cellulose acetate propionate, for example, is dissolved in acetone to produce a film-forming solution and the resulting dope is cast in the form of a film, a very poor product results. On the other hand, when ethylene chloride, a much poorer solvent for the cellulose acetate propionate, is employed, an excellent quality film is produced. In other cases, each of two liquids may, when employed alone, be non-solvent with respect to a given cellulose ester, but in admixture they may be an excellent solvent therefor. When a dope is prepared from such mixed solvents, especially in those cases where one solvent has a higher degree of volatility than the other, a dope can be prepared which is capable of gelation under proper conditions.

Heretofore, gelation has been obtained, either by employing a dope made up from a combined solvent in which the non-solvent predominates and employing a coagulant such as steam to induce gelation, or by employing a dope in which the cellulose ester is dissolved and can remain in solution at a given temperature, but which upon cooling undergoes gelation. Although taking advantage of the broad phenomenon of gelation, the present invention is concerned with neither the two types of dopes nor with the type of gelation phenomena just referred to, as will be apparent from the detailed description which follows:

This invention has as its principal object to provide an improved process for the manufacture of cellulose nitrate photographic film support and sheeting wherein a special type of gelation may be satisfactorily employed. A further object is to provide a process for the manufacture of cellulose nitrate film and sheeting more rapidly and more efficiently than by employing the customary evaporative method of treating cellulose nitrate film-forming dopes. A still further object is to provide an improved type of cellulose nitrate film or sheeting. Other objects will appear hereinafter. These objects are accomplished by the following invention which, in its broader aspects, involves dissolving or dispersing cellulose nitrate containing 11.70% to 12.25% nitrogen in pure ethanol, at a temperature at which doping occurs, and bringing about gelation of the resulting dope by increasing the temperature substantially above the doping temperature but below the boiling point of the solvent. Specifically we have discovered that, notwithstanding that cellulose nitrate of the usual film-forming type, that is, a nitrate having a nitrogen content of about 11.70% to 12.25%, is insoluble in pure ethanol at ordinary room temperature, say 20°–25° C., nevertheless solution or doping may be accomplished by chilling the mixture to or below about 5° C. and that the resulting dope has the unique property of rather suddenly setting or gelling to a clear, transparent condition when warmed to above about 10° C. The gel thus formed resembles an ordinary gelatin gel in clarity and rigidity. This is a most remarkable and unexpected phenomenon in view of the fact that in most gels, not only does the cellulose derivative material precipitate out to give an opaque type of film, but the gel is formed by cooling rather than heating as in the instant case.

As a practical matter, it is inconvenient and uneconomical to use pure ethanol, since this requires refrigeration to obtain a sufficiently low temperature to get the cellulose nitrate into solution, and to maintain the solution in a fluid condition for use. In accordance with our invention we have found that solutions susceptible of conversion, under the conditions of our process, to pure ethanol dopes may be obtained by dissolving the cellulose nitrate in ethanol to which a small percent, say 2–7% of acetone, based on the weight of the mixture is added. Such a mixed solvent has sufficient solvent power with respect to the cellulose nitrate to enable it to be readily dissolved at ordinary room temperature, but due to the greater volatility of the acetone, when the temperature of the solution is raised about 10–20° C., the acetone flashes off and the resulting solution brought into a condition in which it instantaneously sets up into a rigid gel. Inasmuch as the temperatures which we have found satisfactory for forming films are of the order of about 40° C., it will be readily seen that the acetone component of the solvent flashes off very rapidly and the dope is converted into this gel condition almost the instant it reaches the casting surface.

In the following examples and description we have set forth several of the preferred embodiments of our invention, but they are to be regarded merely as illustrations and not as a limitation thereof.

Our invention will be more readily understood by reference to the following examples in which we have set forth two typical film-forming processes in acordance therewith.

*Example 1*

Figure 2:
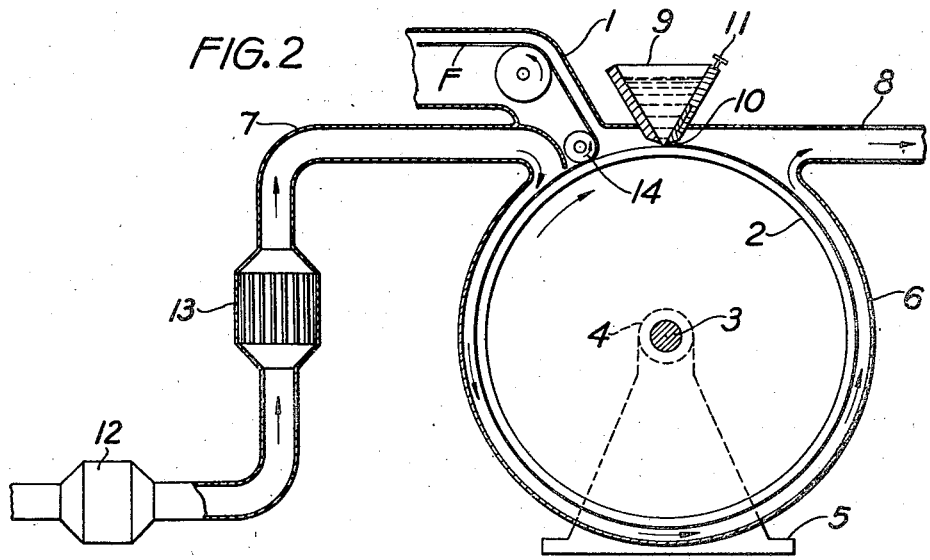
Fig. 2 is a diagrammatic sectional elevational view of a conventional form of device adapted for the manufacture of film or sheeting according to our invention.

650 pounds of anhydrous ethyl alcohol is cooled to 10° C. 10 pounds of camphor are dissolved in the solvent and then 100 pounds of cellulose nitrate having a nitrogen content of 11.90% is added. After complete solution has been accomplished, the temperature of the resulting dope can be raised to about 17.5° C., the dope is then deposited in the form of a film on the polished surface of a slowly rotating wheel or drum of a conventional film-casting type such as illustrated in Fig. 2. The temperature of the air around the wheel is adjusted so that the temperature of the wheel surface is about 20° C. Under the influence of the increase in temperature the dope gels and can be stripped immediately from the wheel at practically any speed within the practical limits of handling of the film. After stripping and curing out the residual solvent which may in this case amount to as much as 60% of the weight of the film at stripping, the resulting product is found to be a clear, transparent sheet or film of excellent quality and well adapted for use as photographic film base.

*Example 2*

A cellulose nitrate having a nitrogen content of about 12.15% was dissolved at a temperature of approximately 20° C. in a solvent-to-solids ratio of about 6.5:1 in a solvent mixture composed of 95% by weight absolute ethyl alcohol and 5% of acetone. The resulting solution or dope was deposited on the surface of a casting wheel such as that of Fig. 2, the temperature of the casting surface being maintained at about 40° C. Under the influence of the relatively high temperature, the volatile acetone component of the solvent flashed off almost immediately upon the solution coming in contact with the casting surface. This flashing off of the acetone component resulted in immediate gelation of the dope which was then composed of cellulose nitrate in pure ethyl alcohol. After the film had travelled about ¾ of the distance around the wheel, it was stripped from the film-forming surface while containing approximately 60% of solvent based on the weight of the total composition of the film and thereafter given an air-curing treatment to remove residual solvent. A clear, transparent film of excellent physical properties and well adapted for use in the manufacture of photographic films was obtained.

Referring to Fig. 2, numeral 1 designates a conventional type of film-forming apparatus comprising the casting or coating wheel 2 mounted to rotate on shaft 3 mounted in bearings 4. The wheel assembly is supported by base 5 and surrounded by wheel casing 6 provided with air inlet conduit 7 and outlet conduit 8.

Numeral 9 designates a conventional type of dope hopper provided with adjustable gate member 10 for regulating the thickness of the dope stream which flows therefrom, adjustment being by means of thumb screw 11 attached in known manner to the gate member 10 and threaded through one wall of the hopper.

Inlet conduit 7 is provided with air filter 12, and heater 13 for heating the air supply thereto. Circulation of the heated air through conduit 7, wheel casing 6 and conduit 8 is accomplished by means of an appropriate air pumping or circulating device (not shown) connected to conduit 8, the solvent laden air being passed to a suitable solvent recovery system (not shown) where solvent is removed therefrom and refined for reuse. Numeral 14 designates a stripping roll to facilitate removal of the coagulated film F from the surface of wheel 2.

The dope hopper 9 may be provided with means for maintaining the temperature of the dope contained therein at the desired point. For example, if a dope is employed which required cooling below ordinary room temperature in order to maintain its fluidity, the hopper may be provided with cooling means either surrounding the hopper or placed within it and submerged in the body of the dope. Similarly, the wheel 2 may be provided with appropriate heating means for raising the wheel surface to the temperature at which gelation of the dope will take place.

Inasmuch as such heating and cooling means are conventional and well within the knowledge of those skilled in the art to which this invention relates, no further description or illustration thereof is necessary.

The operation of the film-forming device illustrated in Fig. 2 will be apparent on inspection. As wheel 2 rotates slowly in the direction indicated by the arrow, dope is fed to the surface thereof from the hopper 9, the thickness of the dope stream being regulated by adjustment of gate member 10 to give a film of appropriate eventual thickness, say of the order of .005". The film passes counter to a current of warm air passing into the apparatus from the inlet conduit 7 and out by means of conduit 8. The casting wheel is heated to and maintained at an appropriate temperature above that of the dope, either by heat acquired from the air stream passing through the wheel casing or from internal heat supplied directly to the wheel itself. This temperature will in all cases be sufficient to occasion substantially immediate gelation of the dope as it reaches the wheel surface and to facilitate evaporation of solvents from the film, but not high enough to have any deleterious action thereon.

As soon as the film has set sufficiently to be satisfactorily removed from the wheel in which condition it may contain appreciable amounts of solvent, it is stripped at stripping roll 14 and may then, in accordance with standard practice, be subjected to appropriate curing treatments such as the air curing and/or water boxing steps referred to above. The film may, in accordance with standard practice be subjected during or after curing, to any other desired treatment such as subbing, the application of backing or anti-halation layers and other treatments. Inasmuch as the present invention is concerned only with the film-forming step per se, no further description of such after treatments is necessary.

As indicated above, the compositions which we employ in accordance with our invention are those in which cellulose nitrate of the film-forming type, that is, cellulose nitrate containing 11.70% to 12.25% nitrogen is dissolved or dispersed at a given temperature, either in pure ethyl alcohol or in ethyl alcohol containing a certain proportion of a more volatile constituent, such as acetone, and which are susceptible to solidification by gelation when subjected to the influence of a higher temperature. The viscosity characteristics of such compositions especially as compared to the non-gelation or non-coagulative types of film-forming solutions, will be apparent by an inspection of the curves constituting Fig. 1.

Figure 1:
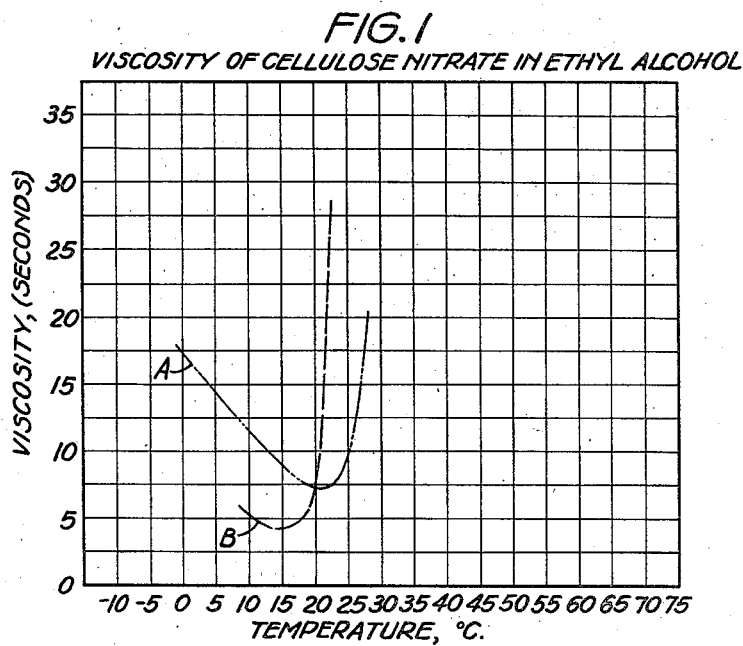
Fig. 1 is a graphical representation of certain viscosity-temperature relationships characteristic of certain gelling and non-gelling types of dopes.

Referring to Fig. 1 the curve marked A represents the viscosity-temperature characteristics of a typical solution susceptible of conversion into a film by the process of our invention, that is, a cellulose nitrate of the film-forming type dissolved in pure ethanol. It will be seen that as the temperature of this composition (which is a clear, transparent solution at 0° C.) is raised, the viscosity decreases until at about 20° C., the solution experiences a sudden increase in viscosity, indicating a sudden gel setting or gelation of the material.

The curve B, which also relates to an ethanol solution of cellulose nitrate (the nitrate in this case being of a slightly different type than that of curve A) further illustrates the gelling effect which results from raising the temperature. In this case it will be seen that as the temperature of the clear dope is gradually raised from about 8° C., at about 15° C. there is a sudden rise in viscosity indicating marked gelation.

In both of the above cases the film-forming composition contains at the gelation or setting stage a relatively large amount of solvent. In fact, it is one of the features of our invention that these compositions will solidify and can be stripped from the film-forming surface with extremely high residual solvent.

The film after stripping should, as previously indicated, be thoroughly cured in order to reduce the residual solvent content to the desired figure which will generally be in the vicinity of 1 or 2% or thereabout. Under ordinary circumstances, residual solvent at stripping may be in the vicinity of 60%, based on the total weight of the film at stripping. While no hard and fast rule can be laid down, it may be said that the amount of solvent present in the film at stripping will be determined by the particular cellulose nitrate dealt with, the solvents employed, temperature of the film-forming surface, speed of casting, and various other factors. The practical limit of residual solvent at stripping is the amount which the film will tolerate and still permit satisfactory stripping, that is, stripping without sticking to the wheel, undue stretching, or the development of mechanical defects. Suffice it to say that the amount of residual solvent at stripping in films produced in accordance with the present invention is very much higher than that which can be present in film produced according to the evaporative or drying down methods of the prior art, in which the residual solvent at stripping will not run over about 15%.

Although we have, as indicated above, found it convenient to illustrate our invention by reference to solutions or dopes composed of cellulose nitrate dissolved in pure ethanol at temperatures in the vicinity of 10° C. or below, in practice it is sometimes desirable to work at higher temperatures. We have found that if a few percent of acetone or equivalent volatile solvent be added to the ethanol, the cellulose nitrate may be placed in solution at ordinary temperatures. Due to the fact that the acetone does not form an azeotrope with ethanol and since it is by far the more volatile component of the solution, it will flash off, thus leaving the cellulose nitrate dissolved in pure ethanol. However, since under the influence of the higher temperature the pure ethanol dope cannot remain fluid, it sets up instantaneously into a rigid gel as soon as the acetone flashes off. The amount of acetone required to obtain solution at ordinary room temperature and still obtain a dope which is susceptible of conversion, by flashing off of the acetone, into a gellable dope, ranges from about 2–7% of the combined solvent.

While we may employ any suitable film-forming type of cellulose nitrate for producing the gellable type of dopes herein described, we have found that certain cellulose nitrates having specific ranges of nitrogen content are outstanding in their ability to produce clear, transparent rigid gels when the temperature of the solution is raised. These are nitrates having a nitrogen content of 11.90% to 12.25% by weight, 11.90% to 12.10% and 12.15% to 12.25%, respectively.

Among these, cellulose nitrates having a nitrogen content of 12.15–12.25% are outstanding.

Although we may employ a relatively wide range of concentrations of the cellulose nitrate in the solvent or solvent combination, we prefer to employ concentrations corresponding to a solvent-to-solids ratio of not over about 7:1. The preferred concentration is, under ordinary circumstances, in the neighborhood of 4:1.

What we claim is:

1. A continuous process for the manufacture of cellulose nitrate film base which comprises dissolving at a temperature of 5–20° C. a cellulose nitrate having a nitrogen content of 11.7–12.25% in a liquid which is an active solvent for the cellulose nitrate only at a temperature below 20° C., which liquid is selected from the group consisting of pure ethanol and solvent mixtures containing 93–100% by weight ethanol and from 7–0% by weight of acetone, casting the resulting solution in the form of a film on a film-forming surface at a temperature approximately 5–20° C. above the temperature at which the cellulose ester is dissolved, whereby the film sets to a clear, transparent, self-supporting gel, stripping the film from the film-forming surface while containing approximately 60% solvent and removing residual solvent from the film.

2. A continuous process for the manufacture of cellulose nitrate film base which comprises dissolving at a temperature of 5–10° C. a cellulose nitrate having a nitrogen content of 11.7–12.25% in pure ethanol, casting the resulting solution in the form of a film on a film-forming surface at a temperature of 5–20° C. above the temperature at which the cellulose ester is dissolved, whereby the film sets to a clear, transparent, self-supporting gel, stripping the film from the film-forming surface while containing approximately 60% solvent and removing residual solvent from the film.

GALE F. NADEAU.
AUSTIN J. GOULD.